Figure 1:
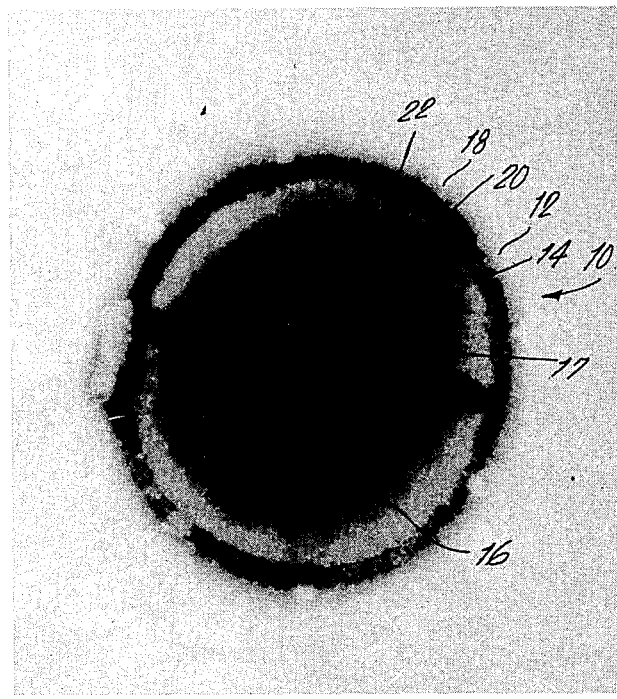

United States Patent

[11] 3,558,066

[72] Inventor Howard Alliger
10 Ponderosa Drive, Melville, N.Y. 11746
[21] Appl. No. 792,663
[22] Filed Jan. 21, 1969
[45] Patented Jan. 26, 1971

[54] ULTRASONIC EXTRACTION OF VIABLE ANTIGENS FROM GRAM POSITIVE BACTERIA
9 Claims, 2 Drawing Figs.
[52] U.S. Cl..................................................... 241/2, 241/30
[51] Int. Cl........................................................B02c 17/16, B02c 19/16, A61k 23/00
[50] Field of Search............................................ 241/2, 30, 170, 172, 175; 424/92, 123; 195/96, 51, 66; 259/1

[56] References Cited
UNITED STATES PATENTS
2,230,997  2/1941  Chambers ..................... 259/1X
2,905,592  9/1959  Shull ............................. 195/51
3,172,815  3/1965  Fox ............................... 424/92

Primary Examiner—Robert C. Riordon
Assistant Examiner—Donald G. Kelly
Attorney—Kenneth S. Goldfarb ABSTRACT: A method of extracting antigens from Gram Positive bacteria cells including injecting ultrasonic energy into a solution of live Gram Positive bacteria contained in a narrow cylindrical vessel cooled by a cooling bath maintained at a temperature less than 0°C. After immersing the tip of an ultrasonic probe into the solution, the probe is energized and the solution is maintained at a temperature close to 0°C. The tip of the probe is removed from the solution after an interval of time necessary to release the appropriate antigens or enzymes from said bacteria cells, and thereafter the antigens are separated, usually as a solution in the medium from the residue of the bacteria cells.

PATENTED JAN 26 1971

3,558,066

INVENTOR.
HOWARD ALLIGER
BY
ATTORNEY

ULTRASONIC EXTRACTION OF VIABLE ANTIGENS FROM GRAM POSITIVE BACTERIA

This invention relates to a method of extracting antigens from live bacteria cells by rupturing or stripping while otherwise destroying the cells by injecting ultrasonic energy into a solution of live Gram Positive bacteria such as staphlococcus or streptococcus without any other chemicals or heat being added.

Antigens are substances contained in the structure of live tissue cells and may be chemicals, enzymes or particulate matter. Different enzymes are located in various portions of the cells. It has long been known that when antigens are injected into a body, the body produces chemicals, or antibodies, which counteract the effect of the foreign antigens and protect the body from the ill effects of subsequent exposure to the bacteria. Although it is well known in the art to rupture bacteria cells with ultrasonic energy, it has been impossible to control with any degree of certainty the point at which complete rupture will take place, to prevent the inactivation of the enzymes, to preserve subcellular particles or to efficiently liberate viable antigens in any sizeable quantity from Gram Positive cells. Moreover, the results from research experiments have not been reproducible.

It is, therefore, the primary object of the present invention to provide a method of extracting antigens from Gram Positive bacteria cells and particularly cells which are unusually tough and resistant such as staphlococcus. The staphlococcus, as for example, strain 2902, is of an approximately 1 micron size and has a relatively hairy protective outer wall which is very resilient and elastic. Antigenic substances may be disposed on the outer wall and others are disposed on the inner wall of the cell, as well as between the outer and inner walls. Certain others may be disposed in the cytoplasm within the confines of the walls and it is to be particularly noted that all of these substances will be released into the solution through the use of concepts of the present invention.

It is a further object of the invention to provide a means for breaking down such tough and resistant Gram Positive cells such as staphlococcus utilizing an ultrasonic probe charge at approximately 10 to 100 kHz. (kiloHertz).

Still another object of the present invention resides in the provision of a method for breaking down the cell walls of tough and resistant Gram Positive bacteria cells and, as heretofore been found impossible, through the introduction of finely divided glass powder which is preferably of a size of 1 to 100 microns, though mainly of approximately 1 to 10 microns which, because of the introduced ultrasonic vibrations, bump, squeeze, mill and press the Gram Positive bacteria cells to the extent that they are ruptured, abraded, scoured and squeezed liberating the desired chemicals, enzymes, or substances to an unusual and unexpectedly optimum extent.

Still further objects and features of this invention reside in the provision of a method of extracting antigens from live bacteria cells that is capable of being utilized without necessitating the transfer from the normal storage containers of the cells, which is capable of utilizing existing equipment, which is highly efficient in operation and which is capable of manufacturing and producing solutions of antigens necessary and useful in further laboratory experimental processes for better understanding the cause, effect and treatment of various diseases.

Figure 2:
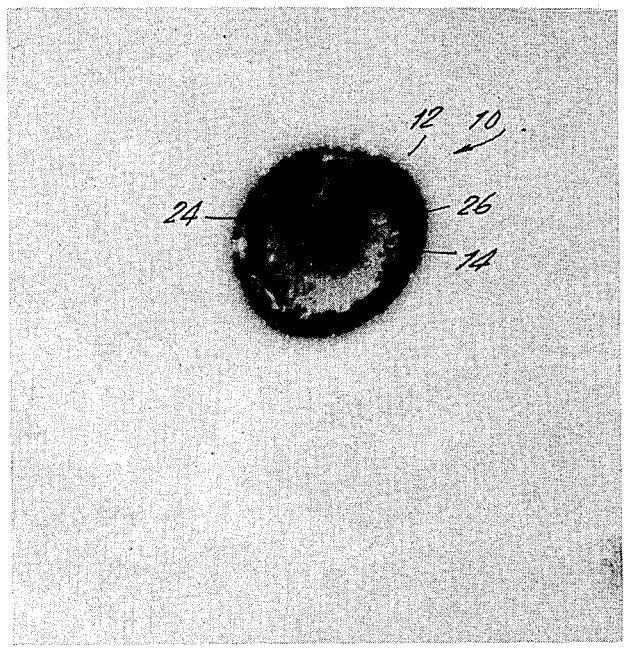

These, together with the various ancillary objects and features of this invention, which will become apparent as the following description proceeds, are attained by this method of extracting antigenic substances, details of the method being indicated in accompanying drawings showing the cells during the steps of operation thereon, by way of illustration only, wherein:

FIG. 1 is a photograph of a staphlococcus cell magnified at 140,000 times prior to introducing ultrasonic vibrations; and, FIG. 2 is a photograph under 70,000 times magnification after 45 minutes of introducing ultrasonic energy illustrating the thick cell wall starting to break up even though the spongy hairy outer layer is still intact.

With continuing reference to the accompanying drawings, wherein like reference numerals designate similar parts of the cell of each of the several views, reference numeral 10 generally designates a Gram Positive bacterial cell of the staphlococcus 2902 strain magnified under an electron microscope. This cell 10 includes an outer wall 12 having a spongy and hairy surface defining a resilient elastic membrane, a relatively thick inner wall 14, as well as the cytoplasm 16 and a nucleus 17 within the inner wall 14. Various antigenic substances, most of which have not as yet been isolated, are contained on the outer surface as indicated at 18 of the outer wall 12, on the inner surface 20 of the inner wall 14 and between the walls as indicated at 22. The cytoplasm 16 also contains various antigens.

Heretofore, it has been impossible to obtain the viable antigens 22 from within walls of Gram Positive bacteria cells due to their toughness and resistance, especially since the harsh means used to make sure the bacteria is dead, destroys the biological activity of the antigens. It has been found that in carrying out the processes of the present invention that additional substances than those heretofore apparently known are released and are all gathered into the resultant solution. According to this invention, it has been found that by injecting ultrasonic energy into a solution of Gram Positive bacteria cells, for example strain 2902, that such cells will be stripped, disintegrated, ruptured, or in some way caused to release the antigens contained therein. The particular chemicals, enzymes or particulate matter which will be released or extracted from the cells into the solution medium will depend upon the amount of time during which the solution is subjected to the energizing process.

The ultrasonic energy to which the solution of bacteria cells are exposed consists of sound waves travelling through the solution medium as alternate compressions and rarifactions. If, when this wave travels through the solution it has a high enough amplitude, the resulting tension-compression cycle causes numerous microscopic bubbles which are first formed and then collapsed, a phenomenon known as cavitation. These bubbles collapse instantly and with great force, or implode, when the ultrasonic energy is sufficiently intense, as it is in the process of this invention, causing local pressure changes in the solution of thousands of atmospheres. This invention may be carried out by using ultrasonic energy from an ultrasonic probe which operates within about 10 to about 100 kHz. However, during most applications of this method, about 20 kHz. will be satisfactory. Conveniently, the equipment used in this invention for producing the ultrasonic energy may be a standard ultrasonic probe which operates at 20 kHz. and, therefore, forms or collapses these bubbles at a rate of 20,000 per second. This shock of mechanical energy breaks cell walls and tears the cell particles apart. If the ultrasonic energy is permitted to continue for a long period of time, the bacteria cells will be completely disintegrated and all of the substances contained therein will be released. If the time is short, on the order of seconds or fractions thereof, the cell wall may be stripped or abraded and cause superficially contained materials and enzymes attached to the surface of the outer cell wall, to be jarred from their positions and released into the solution medium.

For example, when energizing a somewhat concentrated buffered aqueous solution of staphylococcus strain 2902, entire cell disruption results in a period of about 3 hours. With reference to FIG. 1, the materials and enzymes contained on the surface of outer wall 12 of bacterial 10, at 18, will disconnect themselves before those disposed within the cell are affected since the surface quickly responds to the transformation of ultrasonic energy into mechanical energy. The substances will be completely released from wall 12 within approximately 30 seconds. After this, cell walls 12 and 14 rupture or partition causing the cytoplasm 16 and other subcellular particles, including certain enzymes, to "leak out" from its original location into the solution. This process, which takes approximately 30 minutes in this particularly difficult cell, is the second phase of entire cell disintegration. The third, and last phase of cell disruption by ultrasonic energy involves the fragmentation of inner cell wall 14, hairy outer cell wall 12, and the portion of the cell 10 contained therebetween and might take up to 3 hours or longer. Hence, it can easily be seen that by selecting a particular time interval during which a solution of staphlococcus strain 2902 is subjected to ultrasonic energy 20 kHz. antigenic substances located within various portions of cell 10 can be isolated from one another. Further, it is reasonable to suppose that other strains of Gram Positive bacteria cells, much more easily broken than this particular staph strain, will respond to ultrasonic energy injected into solutions of the bacteria for selected time intervals in a manner analogous to that described hereinabove.

FIG. 2 represents one cell of staphlococcus strain 2902 which has been subjected to treatment with ultrasonic energy for 45 minutes. As can be easily seen, the outer wall 12 is in the process of just starting to break up although its spongy hairy surface is still intact, though somewhat defused into the surrounding medium. Also indicative of the early stage in cell disruption is the fact that while outer wall 12 and inner wall 14 are both clearly present, the portion of the cell between the walls indicated at 22 in FIG. 1 has been stretched as indicated at 24. Also, the distinction between the nucleus 17 and the cytoplastic materials 16 is very obscure and barely visible except for the relative density of the portion indicated at 26.

Loss of cell viability and the disruption of fragile cells can take place before collapse-type cavitation. This is due to eddying so-called microstreaming and bubble vibrations. This precavitation activity can cause release of soluble antigenic substances and nucleotides although the cell may still be viable. If an ultrasonically energized solution is kept cool, most enzymes will be little affected by cavitation. When they are adversely affected, it is due to peroxides, free radicals, and oxidation caused by the violently collapsing bubbles. Saturating the solution with $H_2$ may solve the problem for some materials and/or enzymes, but since peroxides will form in the absence of any air, to protect peroxide-sensitive antigens, a scavenger must be added to the solution like Cysteine. Sometimes the cells have their own natural scavenger, such as glutathione.

Although ultrasonic energy disintegrates most types of tissue cells within a few minutes, tough Gram Positive bacteria cells, such as staphlococcus strain 2902, do not respond as readily to cavitation because of the resilient and elastic nature of their nearly spherically shaped hairy, spongy walls. It has been found that the addition of finely divided glass powder to solutions of Gram Positive bacteria enhances the ability of cavitation to break apart the cells. Preferably, the particles of glass which look like beads under a microscope should be on the order of 1 to 100 microns in size and even more preferably, about 1 to 10 microns. Although the action of the glass particles is not completely understood, they are thought to behave as small mechanical hammers which bump, squeeze, mill and press the bacteria cells so that the cells are abraded or ruptured.

The equipment for supplying ultrasonic energy in the process of this invention includes an ultrasonic probe, its tip having a small surface relative to the diameter at the top portion thereof. Since 1960 and the advent of the lead zirconate titanate crystals, the most modern ultrasonic probes operate 20 kHz. and produce bubbles which are larger and collapse more violently than heretofore possible with quartz crystals which had to be used at higher frequencies. Operation at below 20 kHz. causes sound waves transmitted thereby to be audible. Early thin quartz crystals which operated at frequencies of about 500 kHz. produced waves in the liquid in which it travelled having a high enough amplitude to produce the sufficient violent motion to disrupt only certain cells, particularly Gram Negative bacteria. Moreover, probes operated by quartz crystals could only produce an energy up to 10 watts whereas the newer type crystals will transmit 150 watts. Energy is transmitted to the tip of the probe with an intensity of approximately 1,000 watts per square inch due to the stepped horn or probe configuration and also the small tip cross section. Generally, Gram Positive bacteria cells are so difficult to disrupt that they require treatment with the probe at maximum output. Most advantageously and in order for optimal efficiency to result from the process of ultrasonically energizing a solution of live bacterial cells, such as strain 2902, the probe is immersed deep into the solution.

Because the probe operates as such a high intensity, the mechanical energy caused by vibration transforms itself into heat. The heat must be dissipated from the solution medium to prevent injuring the biological activity of the released substances. Therefore, the solution must be cooled by a bath continuously maintained well below 0° C. It is also equally undesirable to cause freezing of the bacteria solution. Preferably, the solution temperature should be maintained in the range of slightly above 0° to about 5°C. The optimum temperature at which cell disintegration, disruption, and/or cleavage takes place is in the range of about 2° to about 3° C.

The delivery of 100 watts of energy to a solution, particularly one having a small volume, requires efficient dissipation of heat to the cooling bath as soon as possible. For optimum cooling, the bath level should be at least as high as the vessel containing the solution. The smaller the sample to be ultrasonically energized, the more difficult is the cooling procedure. For example, energizing 3 ml. for any length of time will require about a −C. cooling bath surrounding the test tube in order that the contents remain below 5° C.; while processing over 200 ml. will only require 0° C. The larger the quantity, the greater the area of processed solution facing the cold bath; and so the greater the rate of heat transfer. The power input, of course, remains the same.

The cooling bath should be agitated or circulated as much as possible. A magnetic stirrer may be convenient for this; or a piece of dry ice in ordinary ice water produces movement by bubbling. Ideally, a water jacketed processing vessel should be used. Ice water circulated rapidly thru the jacket will maintain interior contents below 5° C. whether a large of small quantity is being processed. This is especially convenient for small quantities, say below 10 ml., where ordinarily a −30° C. cooling bath will tend to freeze the test tube contents unless the ultrasonic probe is running within 20 seconds of bringing the test tube in contact with cold bath. Any temperature between −10° and −45° C. can be had by using dry ice and alcohol with varying degrees of water added. Below −45° C. (−65° for thick walled test tubes) a layer of ice tends to form on the inside of the processing tube with the probe operating an maximum output. Some other common solvents used with dry ice are acetone, ethanol, and ethylene glycol. A better and less expensive substitute is 1-methoxy-2-propanol. Dry ice may be added to the latter solvent, available under the trademark Dowanol, without the special care necessary with other solvents which boil over and cloud the processing vessel when dry ice pieces are added.

The transfer of heat between the solution and the bath will be more efficient if the vessel containing the solution affords the greatest possible contact between the bath and surface of the vessel. Therefore, a narrow, cylindrical vessel such as a test tube is better than a beaker. Even more desirable is a thin-walled metal test tube such as a standard stainless centrifuge tube, or, preferably, a narrow thin-walled aluminum tube. Since the tip of the probe must be inserted in the tube, a substantial volume of liquid is displaced by it. However, modern ultrasonic disintegrating equipment can process one-fourth ml. solutions as easily as a 1-liter solution. In addition, it is not undesirable to have a column of solution located above the tip of the probe. Rather, this column will prevent the violent motion of the solution in the area immediately surrounding the tip from causing foaming or splattering of the solution outside of the tube. Also, the rising of the solution in the tube due to displacement by the probe will considerably increase the exposed cooling surface.

The tip of the probe should be completely immersed in the solution being energized. Because of the high power of modern probes and further because Gram Positive bacteria cells are so difficult to rupture at less than full utilization of the maximum output of the probe, unless the tip is completely immersed in the solution, droplets of the solution can scatter out of the test tube. Also, incomplete immersion of the tip might cause foaming of the solution, since the tip would be effectively vibrating in air.

The final step in the process of extracting enzymes from Gram Positive bacteria involves the separation of the still active antigens from the debris caused by rupture of the cell. One method is to merely filter the energized solution with a filter having a porosity of about 0.3 microns. Most of the fragmented cells, cell walls, and dead cells will remain on the filter while the enzymes and other substances will pass through it in solution. Alternatively, the energized solution may be centrifuged to separate the various broken and released substances. The decanted solution may then be filtered in the manner described above.

EXAMPLE 1

Fifteen ml. of a 20 percent buffered aqueous solution of staphlococcus strain 2902 in an aluminum test tube was frozen before its use. Glass powder was added when the solution temperature rose above 0° C. A cooling bath of −14° C. was provided around the tube with dry ice in acetone. dry ice was continuously added during the energizing process to maintain the solution temperature between 2° and 3° C. Operating for about 35 minutes at 20 kHz. and at an intensity of 1,000 watts per square inch, ultrasonic energy caused complete disruption of the strain 2902 cells.

EXAMPLE 2

Fifteen mls. of a concentrated solution of staphlococcus were prepared as in the previous example. The solution strain 2902 was energized for 10 minutes under the same conditions as in example 1 resulting in 89 percent disruption of the cells. With 1 gm. of cells (wet weight), to 2 gm. water, 54.5 mg./ml. of protein was released.

It is also contemplated to process Gram Positive bacteria cells, such as staphlococcus strain 2902, in a continuous cyclic operation which would reprocess the solution to increase the efficiency of the extraction of the antigens from the cells.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. A method of extracting antigens from Gram Positive bacteria cells including immersing the tip of an ultrasonic probe in a solution of Gram Positive bacteria cells in a medium containing finely divided glass powder, energizing said ultrasonic probe so as to introduce ultrasonic energy into said solution for a sufficient period to kill said bacteria while stripping antigenic substances from the cell walls and cytoplasm, maintaining said solution at a temperature in the range above 0° C. and less than 20°C., removing said tip of said probe from said solution after the interval of time necessary for releasing said antigenic substances from said bacteria cells, and then separating said antigenic substances from the residue of said bacteria cells.

2. A method according to claim 1, wherein said solution of bacteria cells is cooled by a cooling bath maintained at a temperature of less than 0° C. while said ultrasonic probe is energized.

3. A method according to claim 2, wherein the temperature of said solution during the energizing of said ultrasonic probe is maintained in the range of between above 0° C. and 5° C.

4. A method according to claim 3, wherein said antigenic substances are separated from the residue of said bacteria cells by filtering said solution through a filter having a porosity on the order of 0.3 microns.

5. A method according to claim 4, including the step of separating antigenic substances as a solution in said medium from said residue of said bacteria cells prior to the filtering thereof by centrifuging to remove at least the major portion of said residue.

6. A method according to claim 1, wherein said ultrasonic energy is introduced into said solution of live bacteria.

7. A method according to claim 1, wherein said glass powder has a particle size in the range of about 1 to about 100 microns and said ultrasonic probe operates in the range of about 10 to about 100 kHz. and the power at said tip of said probe has an intensity of approximately 1,000 watts per square inch.

8. A method according to claim 1, wherein said Gram Positive bacteria cells are staphlococcus strain 2902.

9. A method according to claim 8, wherein said glass powder has a particle size in the range of about 1 to about 10 microns and said ultrasonic probe operates at about 20 kHz. and at an intensity of approximately 1,000 watts per square inch for a period of approximately 3 hours to remove enzymes from between the outer and inner walls of said staphlococcus.